Figure 1:
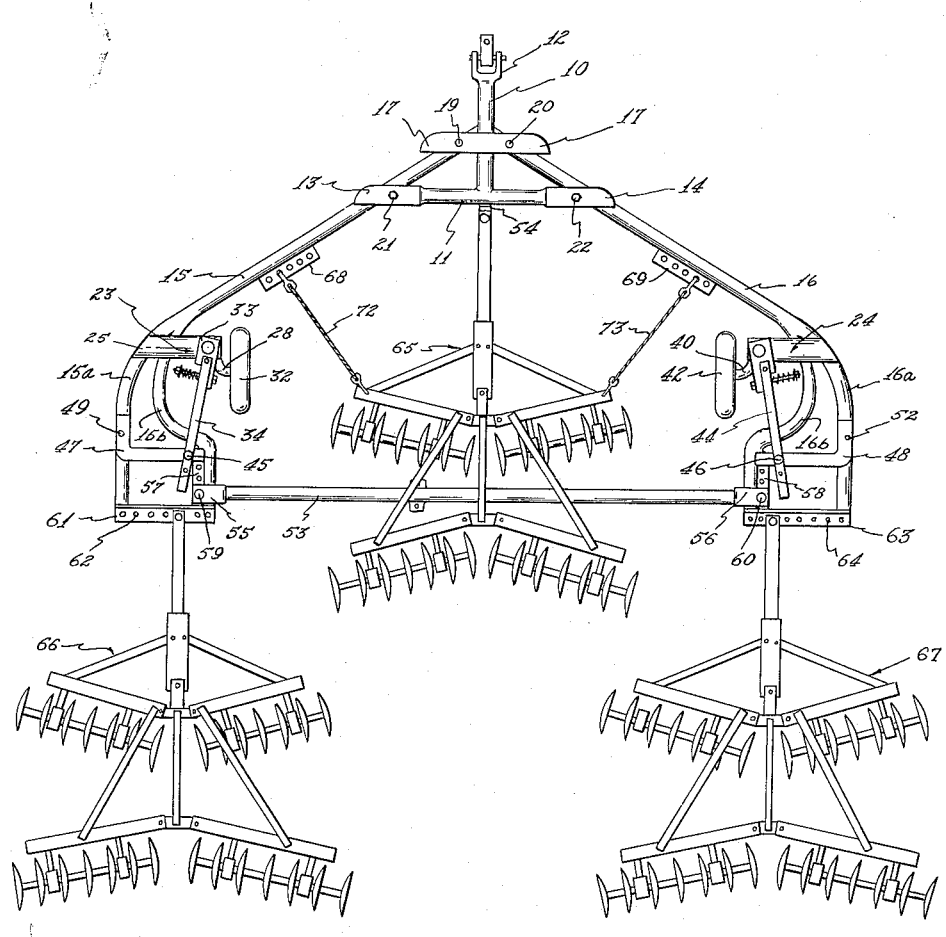

Sept. 6, 1955  M. E. SCHEIBNER  2,716,854
DRAFT HITCH

Filed Sept. 8, 1952  5 Sheets-Sheet 1

INVENTOR.
Maurice E. Scheibner
BY Greek Wells
Atty.

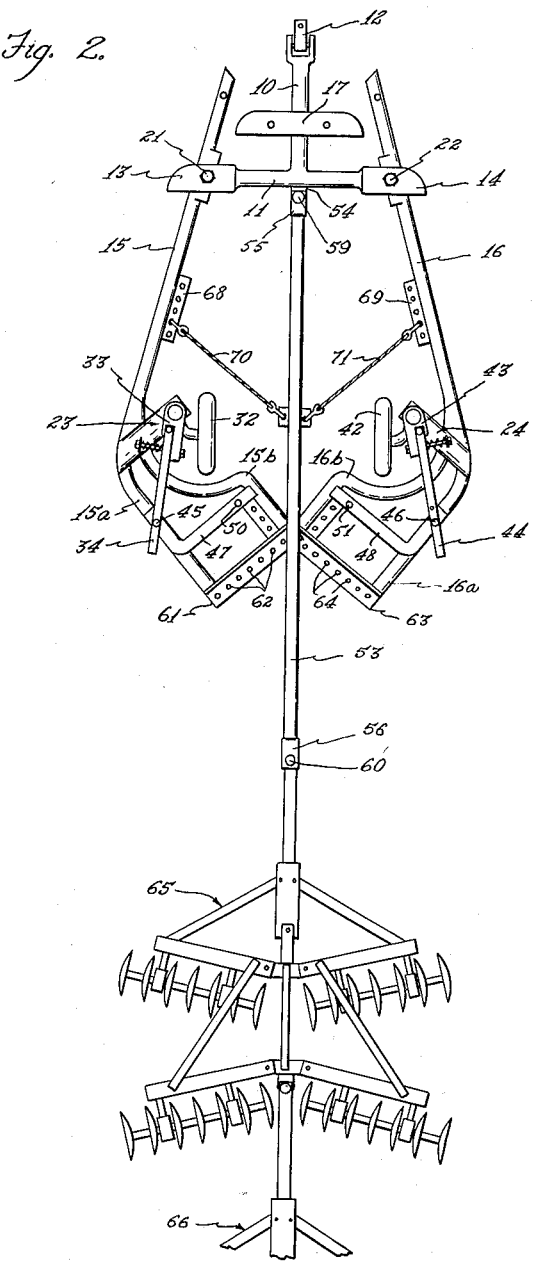

Sept. 6, 1955  M. E. SCHEIBNER  2,716,854
DRAFT HITCH
Filed Sept. 8, 1952  5 Sheets-Sheet 3
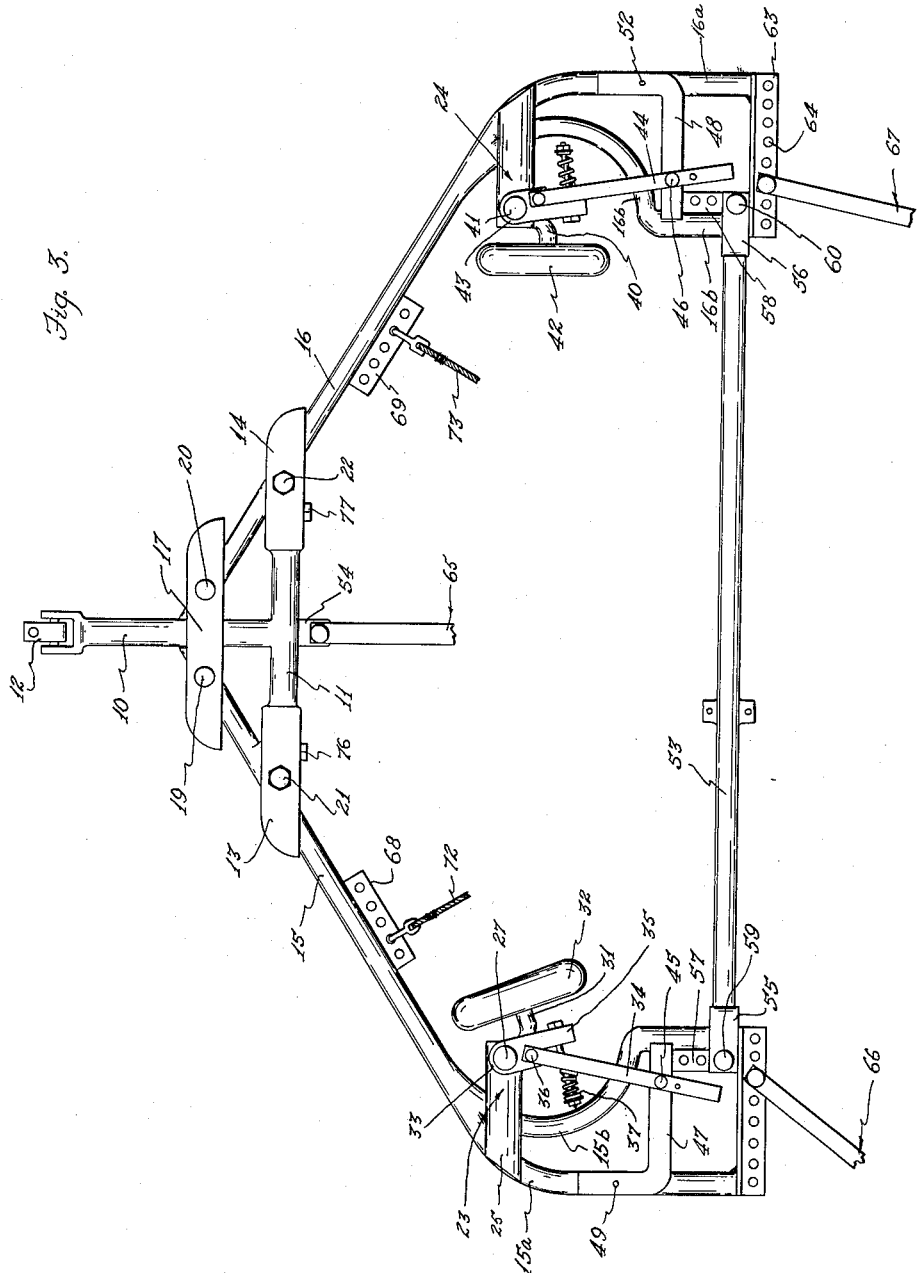
INVENTOR.
Maurice E. Scheibner
BY  *Struhlwells*
*Atty.*

Sept. 6, 1955      M. E. SCHEIBNER      2,716,854
DRAFT HITCH
Filed Sept. 8, 1952      5 Sheets-Sheet 4
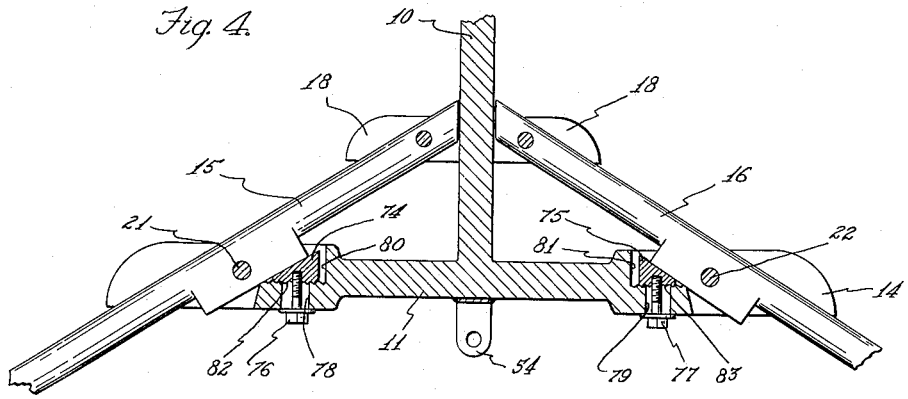
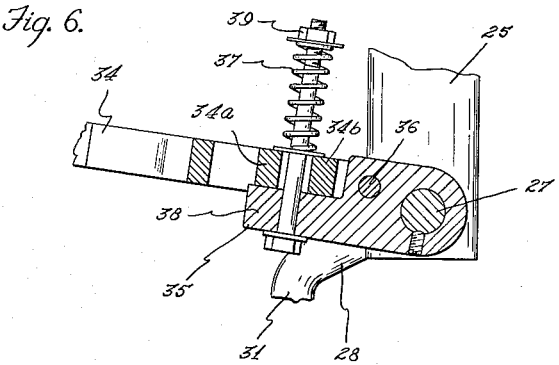
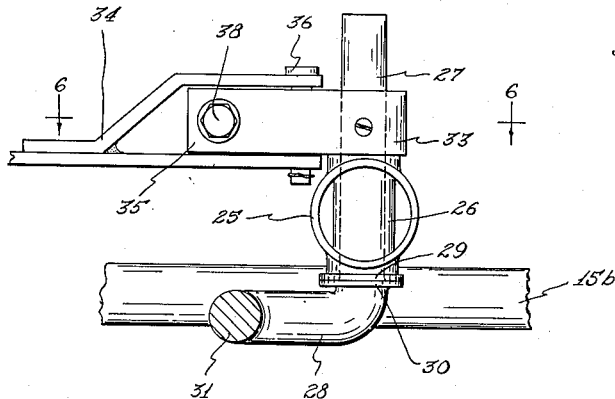
INVENTOR.
Maurice E. Scheibner
BY *Fred Wells*
Atty.

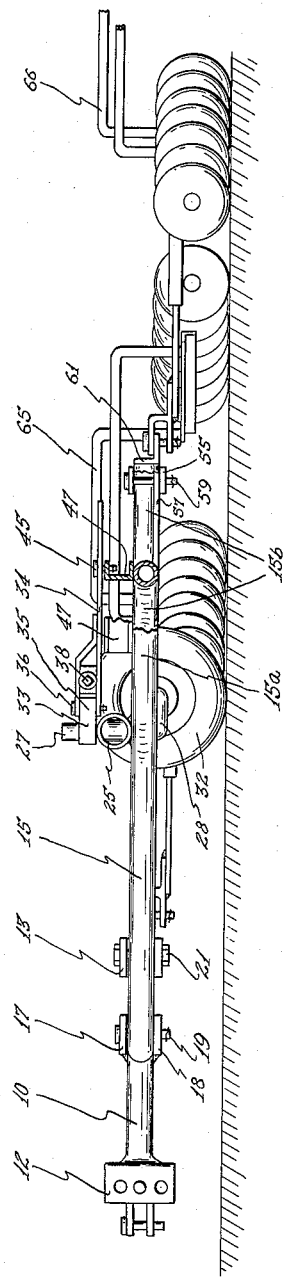

United States Patent Office 2,716,854
Patented Sept. 6, 1955

2,716,854
DRAFT HITCH
Maurice E. Scheibner, Coulee City, Wash.
Application September 8, 1952, Serial No. 308,428
7 Claims. (Cl. 55—89)

The present invention relates to improvements in a draft hitch. The draft hitch is for the purpose of attaching a towing vehicle to a group of three tillage implements such as disk harrows, the hitch being of such construction that in one position it is spread to connect the implements so that they traverse parallel paths and are staggered longitudinally with the middle implement ahead of the outside implements, while in another position the hitch is closed and the implements are attached in tandem position for transportation from one field to another or along the road. It is the principal purpose of this invention to provide a device of this character wherein a central T-shaped tow beam is attached to the vehicle with implement attaching arms pivoted on the cross piece of the tow beam and diverging rearwardly, the arms having wheel frames thereon for supporting the hitch with a combination cross brace and tow bar which serves to hold the arms spread for tillage and to attach the vehicles when they are being transported in tandem.

It is also a purpose of my invention to provide in a draft hitch of this character, a novel wheel mounting whereby the wheel frames and wheels are so connected that the wheels adjust in line with the direction of travel in both the spread and closed position of the implement attaching arms.

A further and more specific object of the invention is the provision in a draft hitch having rearwardly diverging implement attaching arms pivoted to the cross piece of a T-shaped towing beam, the arms being wheel supported intermediate their ends, with means to lock the diverging arms in either of two positions, one where they are spread apart, and the other where they are brought close to each other at the rear ends, so that the tow beam and the implement attaching arms provide a substantially rigid framework in either position of the arms.

My invention contemplates also a mounting of the draft hitch on its supporting wheels whereby the wheels may toe out a limited amount in turning, but are prevented from toeing in, the freedom of the wheels to toe out being combined with a trailing mount of the wheels so that the inside wheel on a turn will be free to swing in the direction of turning instead of sliding transversely.

The nature and advantages of my invention will appear more fully from the following description and the accompanying drawings wherein a preferred embodiment of the invention is shown. It should be understood however, that the drawings and description are illustrative only and are not intended to limit the invention except insofar as it is limited by the claims.

In the drawings:
Figure 1 is a plan view of a draft hitch embodying my invention, showing three disk harrows attached thereto;
Figure 2 is a similar plan view showing the draft hitch closed for towing the tillage implements in tandem;
Figure 3 is an enlarged plan view of the hitch alone showing the parts in the same position as in Figure 1, except that the hitch is being turned and the inside supporting wheel is toeing out;
Figure 4 is a fragmentary horizontal sectional view through the front portion of the draft hitch;
Figure 5 is an enlarged fragmentary detailed view illustrating the manner of attaching the wheels to the draft hitch so that they may toe out;
Figure 6 is a view looking at Figure 5 in the direction of the line 6—6; and
Figure 7 is a view in side elevation of the draft hitch.

Referring now in detail to the drawings, my improved draft hitch embodies a front tow beam 10 which is T-shaped, having a cross piece 11 at one end and having a clevis 12 at the other end for attachment to a towing vehicle. The ends 13 and 14 of the cross piece 11 are bifurcated so as to receive implement attaching arms 15 and 16 which diverge rearwardly from the cross piece 11. The implement attaching arms extend forwardly beyond the cross piece 11 and the tow beam 10 has short transverse bars 17 and 18 secured thereon in front of the cross beam 11 by means of which the front ends of the arms 15 and 16 may be secured to the tow beam 10. Removable pins 19 and 20 are used to secure the front ends of the arms 15 and 16 to the bars 17 and 18. The arms 15 and 16 are pivoted to the cross piece 16 by bolts 21 and 22.

Each of the arms 15 and 16 has a wheel mounting frame thereon intermediate its ends. The wheel mounting frame 23 on the arm 15 and the wheel mounting frame 24 on the arm 16 are alike except that one is left hand and the other is right hand. It is believed that a detailed description of one will suffice for both. As shown, the wheel mounting frame 23 comprises an inwardly extending main frame member 25 which is welded to two diverging portions 15a and 15b of the arm 15. The frame member 25 is shown as tubular in construction and it carries a vertical tubular bearing 26 in which a vertical portion 27 of a wheel arm 28 is pivoted. The bearing 26 has a flange 29 at its lower end and the wheel arm 28 has a flange 30 on which the flange 29 rests. The wheel arm 28 extends rearwardly from the bearing 26 a short distance and then has an inwardly extending portion 31 on which a supporting wheel 32 is journalled.

With the construction just described the natural tendency of the wheel 32 would be to toe in whenever the draft hitch is being drawn forward because it is offset inwardly with respect to pivotal mounting of the portion 27 in the bearing 26. A block 33 is fixed on the portion 27 above the bearing 26 and extends rearwardly in the same direction as the horizontal portion of the wheel arm 28. A lever 34 is overlapped with a rearwardly extending portion 35 of the block 33 and is pivoted by a pivot pin 36 to the block 33 so that it is free to swing away from the portion 35 of the block 33. Cross members 34a and 34b of the lever 34 prevent the lever from swinging in the other direction by engaging the rearward extension 35 of the block 33. A spring 37 is held under compression against the lever 34 by a bolt 38 that extends through the extension 35 so that the spring 37 opposes movement of the lever 34 away from the extension 35. The tension on the spring 37 may be adjusted by a nut 39 on the bolt 38. It is evident from an inspection of Figures 1, 3 and 5 in particular, that the trailing mounting of the wheel 32 and the connection of the block 33 and lever 34 to the wheel mounting as described above, enables the lever 34, if held in the position illustrated in Figure 1, to prevent any toeing in of the wheel 32. However, if there is a force tending to turn the wheel in such a direction as to make it toe out as illustrated in Figure 3 of the drawings, the construction just described will permit the wheel to toe out opposed by the force of the spring 37 tending to hold the parts 34 and 35 in alignment.

The wheel mounting frame 24 mounts a wheel arm 40 and a wheel 42 in the same manner as the wheel arm 28 and the wheel 32 are mounted. The wheel arm 40 has an upright portion 41 pivoted in the frame 24 in the same manner as the portion 27 is pivoted in the frame 23. A block 43 is fixed on the portion 41 and a lever 44 is connected to the block 43 in the same manner that the block 33 and the lever 34 are connected.

The levers 34 and 44 are provided with suitable means to hold them against movement in the two positions illustrated by Figures 1 and 2. This means comprises a pin 45 carried by the lever 34 and a pin 46 carried by the lever 44, together with frame members 47 and 48 fixed to the arms 15 and 16, and provided with openings 49 and 50 in the member 47, and 51 and 52 in the member 48. By removing the pins 45 and 46, the levers 34 and 44 can be shifted between the two positions to adapt the hitch for use with the tillage implements spread out or for moving the hitch and the tillage implements in tandem.

For cooperating with the wheel arms 15 and 16 and the tow beam 10, I provide a combination cross brace and tow bar 53. The tow beam 10 has an attaching lug 54 projecting rearwardly from the cross piece 11 to which the bar 53 can be attached for trailing the implements in tandem. The bar 53 has its ends 55 and 56 bifurcated so that they will pass over the portions 15b and 16b of the arms 15 and 16 and these portions at their rearward ends have flanges 57 and 58 that are apertured to receive pins 59 and 60 that are removably mounted in the ends 55 and 56 of the bar 53. When the bar 53 is mounted as shown in Figures 1 and 3, it serves as a cross brace under compression which relieves the strain on the arms 15 and 16 when these arms are pulling the tillage implements. When the bar 53 is connected as shown in Figure 2 of the drawings, it extends rearwardly beyond the arms 15 and 16 so that it may be used to attach the tongue of the tillage implement.

The rear ends of the arm portions 15a and 15b are connected by a hitch plate 61 which has a plurality of apertures 62. A similar hitch plate 63 connects the rear ends of the arm portions 16a and 16b and this plate is provided with apertures 64. These apertures and the lug 54 provide means for attaching the tongues of the disk units such as 65, 66 and 67. The apertures 62 and 64 provide considerable latitude in the spacing of the disk units so that they may overlap or be spaced from each other laterally the desired amount. When the arms 15 and 16 are brought together as illustrated in Figure 2 of the drawings, a bolt may be passed through the inner end apertures 62 and 64 to connect the rear ends of the arms 15 and 16 to each other. When this is done, it is of course necessary to remove the pins 19 and 20 so that the front end portions of the arms 15 and 16 can move out of the bars 17 and 18 to the position shown in Figure 2. Note that in the position shown in Figure 1, the arms 15 and 16 are connected together by the cross bar 11 and the bars 17 and 18 at their front ends and are connected together by the tow bar 53 at their rear ends to provide a rigid frame. Also when the arms 15 and 16 are brought together as shown in Figure 2, they are connected by the cross piece 11 at their front ends and by a bolt or pin through the apertures 62 and 64 at the rear end so that they provide a unitary frame. The wheel control levers 34 and 44 are shifted in making the change from spread position to closed position and are held in either position by the pins 45 and 46.

The drag of the disk units 66 and 67 is transmitted through the arms 15 and 16 to the cross piece 11. The disk unit 65 on the other hand is pulled directly by the tow beam 11 through its lug 54. When the hitch is being used to trail the disk units tandem fashion, the entire pull is directly on the beam 10 through the lug 54 and the bar 53. It may be desirable to keep the bar 53 from swinging sidewise far enough to cause difficulty when towing the disk units tandem fashion. To overcome this possibility, I provide plates 68 and 69 intermediate the ends of the arms 15 and 16. Cables 70 and 71 indicated in Figure 2 of the drawings, can be used to attach the bar 53 to the plates 68 and 69. In a similar fashion, cables 72 and 73 can be run from the plates 68 and 69 to the central tillage implement 65 to keep it from swinging sidewise too far and interfering with the cross bar 53 when the tillage implements are spread out for tilling the ground.

The principal point of wear of course, is at the connection of the arms 15 and 16 to the cross piece 11 through the pins 21 and 22. To take care of this and to protect the pins 21 and 22, I provide adjustable wedge blocks 74 and 75 on the bifurcated end portions 13 and 14 of the cross piece 11. These blocks are held in place by bolts 76 and 77 which thread into the blocks through apertures 78 and 79 in the ends of the cross piece 11. The blocks are seated in recesses 80 and 81 of the cross piece 11 and have serrations 82—83 set in similar serrations provided in the recesses 80 and 81 so as to keep the blocks from slipping under lateral pressure. By adjusting the blocks 74 and 75, the wear on the pins 21 and 22 can be kept to a minimum.

It is believed that the construction and operation of my improved draft hitch will be clear from the foregoing description. It will be noted that the wheels 32 and 42 are positioned well forward of the rear end of the hitch so as to balance the weight of the hitch sufficiently that the front end of the beam 10 can be lifted and lowered by hand with no difficulty. Normally the wheels 32 and 42 extend parallel to the tow beam 10 but the inner wheel may toe out when the hitch and the attached implements are being turned. In this way the inner wheel can follow a short circle around the inner disk unit without having to slide sidewise on the ground. The load is at all times distributed between the lug 54 and the two arms 15 and 16 so as to avoid excessive strain on either part. The tow bar 53 serves the double duty as acting as a cross brace and as a tow bar. Whenever it is desired to change the hitch from the spread position to the closed position or vice versa, this is readily accomplished by removing the pins 19 and 20 and the tow bar 53, connecting the tow bar to the lug 54, bringing the arms 15 and 16 together at their rear ends and shifting the wheels 32 and 42 by means of the levers 34 and 44.

Having thus described my invention, I claim:

1. A draft device for attaching a towing vehicle to a trio of tillage implements such as disk harrows in spread position where the implements traverse parallel paths and are staggered with the middle implement ahead of the outside implements, and in tandem position for transportation, said device comprising a T-shaped tow beam having means at the free end of the stem for attaching it to the towing vehicle, the cross piece of the tow beam having pivots at its ends, implement attaching arms attached to said pivots, said arms extending forwardly and rearwardly from the cross piece and diverging rearwardly from the pivots, wheel frames fixed to the rear ends of said arms, a combination cross brace and tow bar detachably connected to the wheel frames to maintain the arms in their outermost spread position and the tow beam having a tow bar attaching lug and said cross brace, when detached from the wheel frames, being attachable to the tow beam for trailing the implements, wheels supporting the wheel frames, the portions of arms extending forwardly from the cross piece and the stem of the tow beam having securing members thereon for securing the said portions of the arms to the stem with the rear portions of the arms in outermost spread position, and implement attaching means on the rear of said wheel frames, operable also to interconnect the wheel frames when the arms are not spread.

2. A draft device for attaching a towing vehicle to a trio of tillage implements such as disk harrows in spread position where the implements traverse parallel paths and are staggered with the middle implement ahead of the outside implements, and in tandem position for transportation, said device comprising a T-shaped tow beam having means at the free end of the stem for attaching it to the towing vehicle, the cross piece of the tow beam having pivots at its ends, implement attaching arms attached to said pivots, said arms extending forwardly and rearwardly from the cross piece and diverging rearwardly from the pivots, wheel frames fixed to the rear ends of said arms, a combination cross brace and tow bar detachably connected to the wheel frames to maintain the arms in their outermost spread position and the tow beam having a tow bar attaching lug and said cross brace, when detached from the wheel frames, being attachable to the tow beam for trailing the implements, wheels supporting the wheel frames, the portions of arms extending forwardly from the cross piece and the stem of the tow beam having securing members thereon for securing the said portions of the arms to the stem with the rear portions of the arms in outermost spread position, and implement attaching means on the rear of said wheel frames, operable also to interconnect the wheel frames when the arms are not spread, the wheels being mounted to the wheel frames for adjustment to align with the tow beam in both spread and closed position of the arms, a manually operable member on each wheel frame for securing the wheels in either position of adjustment.

3. A draft device for attaching a towing vehicle to a trio of tillage implements such as disk harrows in spread position where the implements traverse parallel paths and are staggered with the middle implement ahead of the outside implements, and in tandem position for transportation, said device comprising a T-shaped tow beam having means at the free end of the stem for attaching it to the towing vehicle, the cross piece of the tow beam having pivots at its ends, implement attaching arms attached to said pivots, said arms extending forwardly and rearwardly from the cross piece and diverging rearwardly from the pivots, wheel frames fixed to the rear ends of said arms, a combination cross brace and tow bar detachably connected to the wheel frames to maintain the arms in their outermost spread position and the tow beam having a tow bar attaching lug and said cross brace, when detached from the wheel frames, being attachable to the tow beam for trailing the implements, wheels supporting the wheel frames, the portions of arms extending forwardly from the cross piece and the stem of the tow beam having securing members thereon for securing the said portions of the arms to the stem with the rear portions of the arms in outermost spread position, and implement attaching means on the rear of said wheel frames, operable also to interconnect the wheel frames when the arms are not spread, the wheels being mounted to the wheel frames for adjustment to align with the tow beam in both spread and closed position of the arms, a manually operable member on each wheel frame for securing the wheels in either position of adjustment, and yielding means in the wheel mounting providing limited toe-out of the wheels but no toe-in.

4. A draft device for attaching a towing vehicle to a trio of tillage implements such as disk harrows in spread position where the implements traverse parallel paths and are staggered with the middle implement ahead of the outside implements, said device comprising a T-shaped tow beam having means at the free end of the stem for attaching it to the towing vehicle, the cross piece of the tow beam having pivots at its ends, implement attaching arms attached to said pivots, said arms extending forwardly and rearwardly from the cross piece and diverging rearwardly from the pivots, wheel frames fixed to the rear ends of said arms, a cross brace bar interposed between the wheel frames maintaining the arms in spread position, wheels supporting the wheel frames, the portions of arms extending forwardly from the cross piece and the stem of the tow beam having securing members thereon for securing the said portions of the arms to the stem with the rear portions of the arms in outermost spread position, and implement attaching means on the rear of said wheel frames, operable also to interconnect the wheel frames when the arms are not spread, the wheels being mounted to the wheel frames for adjustment to align with the tow beam in both spread and closed position of the arms, a manually operable member on each wheel frame for securing the wheels in either position of adjustment, and yielding means in the wheel mounting providing limited toe-out of the wheels but no toe-in.

5. A draft device for attaching a towing vehicle to a trio of tillage implements such as disk harrows in spread position where the implements traverse parallel paths and are staggered with the middle implement ahead of the outside implements, said device comprising a T-shaped tow beam having means at the free end of the stem for attaching it to the towing vehicle, the cross piece of the tow beam having pivots at its ends, implement attaching arms attached to said pivots, said arms extending forwardly and rearwardly from the cross piece and diverging rearwardly from the pivots, wheel frames fixed to the rear ends of said arms, a cross brace bar interposed between the wheel frames maintaining the arms in spread position, wheels supporting the wheel frames, the portions of arms extending forwardly from the cross piece and the stem of the tow beam having securing members thereon for securing the said portions of the arms to the stem with the rear portions of the arms in outermost spread position, and implement attaching means on the rear of said wheel frames, operable also to interconnect the wheel frames when the arms are not spread.

6. A draft device for attaching a towing vehicle to a trio of tillage implements such as disk harrows in spread position where the implements traverse parallel paths and are staggered with the middle implement ahead of the outside implements, said device comprising a T-shaped tow beam having means at the free end of the stem for attaching it to the towing vehicle, the cross piece of the tow beam having pivots at its ends, implement attaching arms attached to said pivots and diverging rearwardly from the pivots, wheel frames fixed to the rear ends of said arms, a cross brace bar interposed between the wheel frames maintaining the arms in spread position, wheels supporting the wheel frames, implement attaching means on the rear of the wheel frames, trailing axle mounts for the wheels having upright portions pivoted in the wheel frames, levers secured to the upright portions and cooperating connecting means on the levers and frames for holding the wheels aligned with the tow beam.

7. A draft device for attaching a towing vehicle to a trio of tillage implements such as disk harrows in spread position where the implements traverse parallel paths and are staggered with the middle implement ahead of the outside implements, said device comprising a T-shaped tow beam having means at the free end of the stem for attaching it to the towing vehicle, the cross piece of the tow beam having pivots at its ends, implement attaching arms attached to said pivots and diverging rearwardly from the pivots, wheel frames fixed to the rear ends of said arms, a cross brace bar interposed between the wheel frames maintaining the arms in spread position, wheels supporting the wheel frames, implement attaching means on the rear of the wheel frames, trailing axle mounts for the wheels having upright portions pivoted in the wheel frames, levers secured to the upright portions, cooperating connecting means on the levers and frames for holding the wheels aligned with the tow beam, and means connecting the levers to said portions providing limited toe-out movement of each wheel.

References Cited in the file of this patent

UNITED STATES PATENTS

| | | |
|---|---|---|
| 1,050,439 | Erdmann | Jan. 14, 1913 |
| 1,636,802 | Bozard | July 26, 1927 |
| 2,139,200 | Moyer | Dec. 6, 1938 |